(12) United States Patent
Zeng

(10) Patent No.: US 10,698,509 B2
(45) Date of Patent: Jun. 30, 2020

(54) DISPLAY SCREEN ASSEMBLY, TERMINAL FRONT COVER, AND TERMINAL

(71) Applicant: Guangdong Oppo Mobile Telecommunications Corp., Ltd., Dongguan, Guangdong (CN)

(72) Inventor: Yuanqing Zeng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 235 days.

(21) Appl. No.: 15/495,510

(22) Filed: Apr. 24, 2017

(65) Prior Publication Data

US 2017/0229062 A1    Aug. 10, 2017

Related U.S. Application Data

(63) Continuation-in-part of application No. PCT/CN2016/086709, filed on Jun. 22, 2016.

(30) Foreign Application Priority Data

Jul. 24, 2015    (CN) .......................... 2015 1 0443131

(51) Int. Cl.
*G06F 3/041*    (2006.01)
*H04M 1/02*    (2006.01)
(Continued)

(52) U.S. Cl.
CPC ............. *G06F 3/041* (2013.01); *G02B 6/005* (2013.01); *G02B 6/009* (2013.01); *G06F 1/1603* (2013.01);
(Continued)

(58) Field of Classification Search
None
See application file for complete search history.

(56) References Cited

U.S. PATENT DOCUMENTS 9,151,978 B2    10/2015    Tsurusaki et al.
2006/0274223 A1*   12/2006    Hsu ...................... G02B 6/0031
                                                               349/58
(Continued)

FOREIGN PATENT DOCUMENTS

| CN | 103190081 A | 7/2013 |
| CN | 103207468 A | 7/2013 |

(Continued)

OTHER PUBLICATIONS

Extended European search report issued in corresponding European application No. 16829717.4 dated Nov. 7, 2017.

*Primary Examiner* — Nitin Patel
*Assistant Examiner* — Amen Woldesenbet Bogale
(74) *Attorney, Agent, or Firm* — Young Basile Hanlon & MacFarlane, P.C.

(57) ABSTRACT

A display screen assembly comprises a display screen, a touch panel, and a cover plate that are stacked sequentially. The display screen includes a display surface, the display surface has a display area and a non-display area surrounding the display area; the touch panel covers the non-display area and is provided with at least one virtual key; the cover plate comprises a light shielding band corresponding to the non-display area, the light shielding band comprises a key area, and the key area is configured to correspond to the at least one virtual key. The display screen assembly further has a lighting assembly configured to illuminate the key area.

15 Claims, 5 Drawing Sheets

(51) Int. Cl.
  *H04M 1/22* (2006.01)
  *G06F 1/16* (2006.01)
  *G09G 3/32* (2016.01)
  *F21V 8/00* (2006.01)
  *H04M 1/23* (2006.01)

(52) U.S. Cl.
  CPC ............ *G06F 1/1643* (2013.01); *G09G 3/32* (2013.01); *H04M 1/02* (2013.01); *H04M 1/0266* (2013.01); *H04M 1/22* (2013.01); *G06F 2203/04107* (2013.01); *H04M 1/236* (2013.01); *H04M 2250/22* (2013.01)

(56) References Cited

U.S. PATENT DOCUMENTS

| | | |
|---|---|---|
| 2010/0273530 A1 | 10/2010 | Jarvis |
| 2010/0302478 A1 | 12/2010 | Oohira |
| 2011/0141390 A1 | 6/2011 | Lee et al. |
| 2011/0148766 A1* | 6/2011 | Huang .................. G06F 3/0202 345/168 |
| 2012/0106201 A1 | 5/2012 | Choi et al. |
| 2012/0268402 A1* | 10/2012 | Wang ...................... G06F 3/041 345/173 |
| 2012/0276957 A1* | 11/2012 | Yang .................. H04M 1/0266 455/566 |
| 2013/0120273 A1 | 5/2013 | Choi et al. |
| 2014/0028931 A1 | 1/2014 | Tsurusaki et al. |
| 2014/0049826 A1 | 2/2014 | Lee |
| 2014/0085860 A1 | 3/2014 | Wang et al. |
| 2014/0092034 A1 | 4/2014 | Franklin et al. |
| 2014/0125610 A1 | 5/2014 | Oh |
| 2014/0132539 A1* | 5/2014 | Huang .................. G06F 1/1692 345/173 |
| 2014/0139758 A1* | 5/2014 | Jian ....................... G06F 3/0412 349/12 |
| 2014/0177151 A1* | 6/2014 | Manda ................ H04M 1/0252 361/679.3 |
| 2014/0195974 A1 | 7/2014 | Ballard et al. |
| 2014/0253501 A1* | 9/2014 | Noguchi ............. G02F 1/13338 345/174 |
| 2014/0285730 A1* | 9/2014 | Liu ........................ G06F 1/169 349/12 |
| 2016/0054823 A1* | 2/2016 | Kim ..................... G06F 1/1643 345/173 |
| 2017/0192291 A1 | 7/2017 | Shi |
| 2017/0229062 A1 | 8/2017 | Zeng |

FOREIGN PATENT DOCUMENTS

| | | |
|---|---|---|
| CN | 203338278 U | 12/2013 |
| CN | 103672741 A | 3/2014 |
| CN | 204009308 U | 12/2014 |
| CN | 104698684 A | 6/2015 |
| CN | 105187573 A | 12/2015 |
| EP | 2568363 A2 | 3/2013 |

* cited by examiner

DISPLAY SCREEN ASSEMBLY, TERMINAL FRONT COVER, AND TERMINAL

CROSS-REFERENCE TO RELATED APPLICATION(S)

This application is a continuation-in-part of PCT/CN2016/086709, filed on Jun. 22, 2016, which claims the benefit of priority to Chinese Patent Application No. 201510443131.1, filed on Jul. 24, 2015, which disclosures are herein incorporated by reference.

TECHNICAL FIELD

The present disclosure relates to the field of display screen, and particularly to a display screen assembly, a terminal front cover, and a terminal.

BACKGROUND

The display screen assembly of a traditional mobile phone is composed of a cover plate and a display screen. The cover plate is laminated on the display screen. The inner surface of the cover plate is generally divided into two parts, that is, an ink area and a display area. The ink area is formed by applying an ink layer on the inner surface of the cover plate. The ink layer is used to shield the area at the edge of the display screen where images cannot be displayed, while the display area is an area where the cover plate can effectively display images of the display screen. Generally, the ink area does not display any images on the exterior surface of the cover plate, and therefore, the ratio of the display area to the exterior surface of the cover plate cannot be improved. It can be difficult to obtain a larger display screen and is not ergonomic.

DETAILED DESCRIPTION

Figure 1:
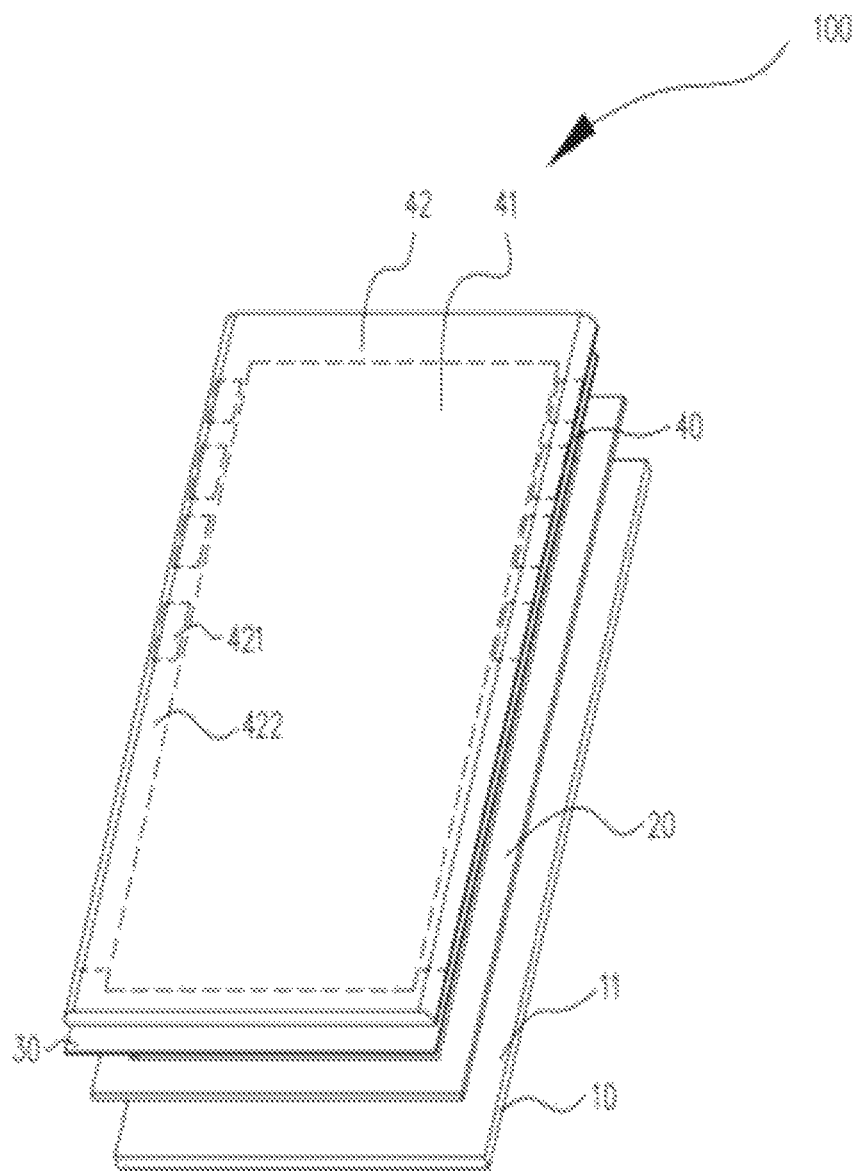
FIG. 1 is a schematic view of a display screen assembly according to an implementation of the present disclosure.

Hereinafter, implementations of the present disclosure are described in detail, examples of which are illustrated in the accompanying drawings, where the same or similar reference numerals refer to the same or similar elements or elements having the same or similar functions throughout the specification. The implementations described below with reference to the accompanying drawings are exemplary and are for the purpose of explaining the present disclosure, and should not be construed as limiting the present disclosure.

In the description of the present disclosure, the orientation or positional relationship indicated by the terms "center", "up", "down", "front", "rear", "left", "right", "vertical", "horizontal", "top", "bottom", "inside", "outside" and the like, is based on the orientation or positional relationship illustrated in the drawings and merely for the purpose of facilitating the description of the present disclosure and simplifying description, rather than indicating or implying that the device or element referred to must have a specific orientation or constructed and operated in a particular orientation, and therefore, should not be construed as limiting the present disclosure.

It should be noted that, the terms "first", "second" are used merely for the purpose of description, and should not be interpreted as indicative or suggestive of the relative importance or implied quantity of the technical characteristics indicated. Thus, the characteristics defined by the terms "first" and "second" can include one or more of the features, either explicitly or implicitly. Further, in the description of the present disclosure, unless otherwise stated, "multiple" means two or more than two.

In the following, the same reference numerals are used to refer to the same or similar elements throughout the specification.

A display screen assembly 100 according to an implementation of the first aspect will be described with reference to FIG. 1 and FIG. 2.

As illustrated in FIG. 1, the display screen assembly 100 according to the implementation of the first aspect includes a display screen 10, a lighting assembly such as a light guide plate 20 and/or additional components thereof (a light source for example), the touch panel 30, and a cover plate 40. As another implementation, the lighting assembly can also be an annular LED array.

Figure 2:
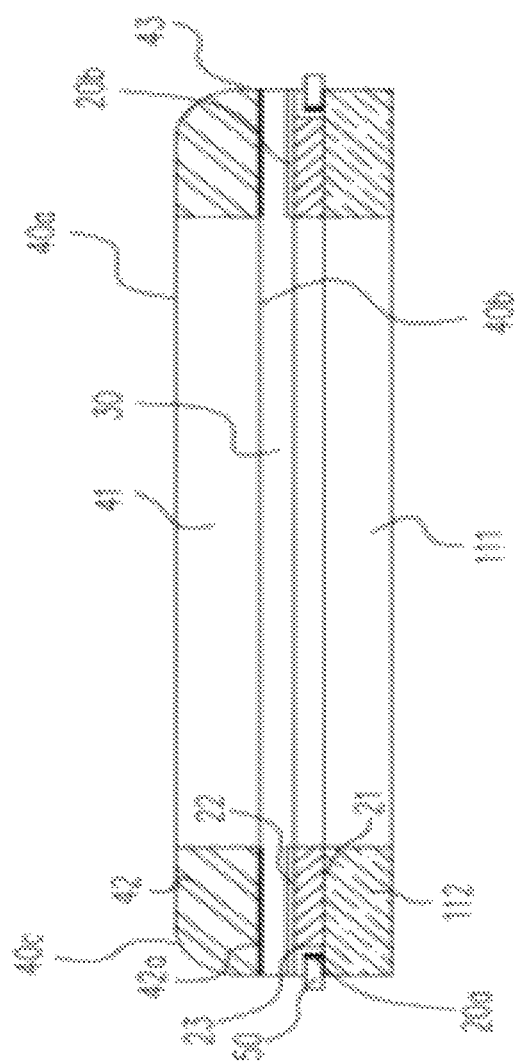
FIG. 2 is a cross-sectional view of the display screen assembly illustrated in FIG. 1.

As illustrated in FIG. 1 and FIG. 2, the display screen 10, the light guide plate 20, the touch panel 30, and the cover plate 40 are sequentially stacked. The display screen 10 includes a display surface 11. The display surface 11 has a display area 111 and a non-display area 112. The non-display area 112 surrounds the display area 111. The light guide plate 20 is arranged on one side (for example, the upper side of FIG. 1 and FIG. 2) of the display screen 10 that is adjacent to the display surface 11. The light guide plate 20 covers the non-display area 112. The outer edge of the light guide plate 20 is provided with a light source 20a. The light source 20a is configured to illuminate the light guide plate 20.

The display surface 11 is disposed on one side of the display screen 10 that is adjacent to the light guide plate 20. The display area 111 is an area of the display screen 10 that can display image information effectively. The non-display area 112 is an area of the display screen 10 that cannot display the image information effectively. Normally, the non-display area 112 is used for circuit connection, or is provided with a backlight lamp, or is used for packaging a liquid crystal layer of the display screen 10. The display screen 10 can be one of a LCD (Liquid Crystal Display) screen and a LCM (LCD Module) component. The display screen 10 can also be a widely used touch screen. For example, the display screen 10 can be an in-cell touch screen in which a touch layer is embedded into liquid crystal pixels. The display screen 10 can be an on-cell touch screen in which the touch layer is arranged on the liquid crystal pixels. The display screen 10 can also be a full-fit touch screen in which the touch layer is fully attached to the cover plate.

The touch panel 30 is disposed on one side (for example, the upper side of FIG. 1 and FIG. 2) of the light guide plate 20 that is remote from the display screen 10. The touch panel 30 covers the light guide plate 20. The touch panel 30 is provided with at least one virtual key (not illustrated in the figures). For ease of explanation, in the following, take one virtual key as an example for description.

The cover plate 40 is provided on one side of the touch panel 30 that is remote from the light guide plate 20. The cover plate 40 includes a light transmitting portion 41 and a light shielding band 42 enclosing the periphery of the light transmitting portion 41 (that is, surrounding the light transmitting portion 41). The light emitted from the light source 20a are adapted to pass through the light guide plate 20, a key area 421, and the light transmitting portion 41.

The key area 421 is configured to be illuminated by the light of the lighting assembly such as the light guide plate, more specifically, the light source 20a. The light transmitting portion 41 passes through the light of the display area 111 correspondingly. The light shielding band 42 includes the key area 421 and areas other than the key area 421. The areas other than the key area 421 can be provided around the key area 421 and can be referred to as a shielding area 422. The key area 421 can be illuminated by the light of the light guide plate 20 and pass through the light of the light guide plate 20. The key area 421 can be disposed corresponding to the virtual key of the touch panel 30 (that is, the key area 421 corresponds to the virtual key). The shielding area 422 shields the light of the light guide plate 20.

In the display screen assembly 100 according to the implementation of the present disclosure, the light guide plate 20 is configured to cover the light guide plate 20 correspondingly, and the light source 20a is configured to illuminate the light guide plate 20. In addition, the light shielding band 42 is configured to include the key area 421 and the shielding area 422 provided around the key area 421. The key area 421 is configured to pass through the light of the light guide plate 20 and is arranged corresponding to the virtual key of the touch panel 30. The shielding area 422 is configured to shield the light of the light guide plate 20, such that the non-display area 112 of the display screen 10 can be utilized and the space of the display screen assembly 100 used to arrange keys can be saved, and therefore, the display area of the display screen assembly 100 can be enlarged effectively and this is ergonomic. It is to be understood that the display screen assembly 100 is applicable to a terminal device. The terminal device can be one of a mobile phone, a notebook computer, a tablet computer, an electronic reader, an electronic album, a display and the like.

The light guide plate 20 has a first surface and a second surface which are disposed opposite to each other. The first surface is adjacent to the display screen 10 and the second surface is adjacent to the touch panel 30. The first surface and the second surface can be formed as planes parallel to each other, or, the second surface can be formed as an arc-shaped surface. For example, as illustrated in FIG. 1, the light guide plate 20 is annular. The light guide plate 20 includes a bottom surface 21 (i.e., the first surface) and a top surface 22 (i.e., the second surface) which are disposed opposite to each other. The light guide plate 20 further includes an outer side surface 23 provided between the bottom surface 21 and the top surface 22. The bottom surface 21 is correspondingly attached to the non-display area 112 of the display surface 11. The top surface 22 is attached to the touch panel 30. The outer side surface 23 corresponds to the edge of the display surface 11. The outer side surface 23 is configured to receive the light of the light source 20a, whereby the light guide plate 20 can be illuminated and the top surface 22 can emit light. The light emitted by the top surface 22 can pass through the touch panel 30 as well as the key area 421, thus making the key area 421 visible. In this way, the key area 421 can identify the virtual key of the touch panel 30, and the non-display area 112 of the display surface 11 can be utilized to receive touch instructions. In this implementation, the top surface 22 is parallel to the bottom surface 21, so that the thickness of the light guide plate 20 can be reduced. In other implementations, the top surface 22 may be an arc-shaped surface such that the light emitting area of the top surface 22 is larger and the area of the key area 421 can be increased.

In this implementation, the touch panel 30 can be integrated into the cover plate 40, that is, the touch panel 30 is integrated with the cover plate 40, and in other words, the touch panel 30 is integrally formed with the cover plate 40. The touch panel 30 covers the light guide plate 20 correspondingly and covers the display area 111 of the display screen 10. So that the touch panel 30 corresponding to the non-display area 112 or the display area 111 can realize the input of touch instructions. Multiple virtual keys can be provided. The multiple virtual keys can implement input of multiple different key instructions. In other implementations, the touch panel 30 is annular; the touch panel 30 correspondingly covers the light guide plate 20.

In this implementation, the cover plate 40 is made of glass. The cross-section of the cover plate 40 is parallel to the display surface 11 of the display screen 10. The cover plate 40 is a rectangular plate member. The cover plate 40 includes an outer surface 40a and an inner surface 40b which are disposed opposite to each other. The outer surface 40a faces the user and is the exterior surface of the cover plate 40. The inner surface 40b deviates from the user. The inner surface 40b covers the light guide plate 20 and the display area 111 correspondingly. The light transmitting portion 41 of the cover plate 40 can enhance the light transmittance of the display screen 10 and can enhance the visual effect of the display screen assembly 100. The light shielding band 42 shields the light guide plate 20; that is, the light shielding band 42 covers the non-display area 112 of the display screen 10, thereby preventing (or limiting) the non-display area 112 from affecting the visual effect. The cover plate 40 further includes an outer side wall 43 secured between the outer surface 40a and the inner surface 40b. The outer side wall 43 may be fixed to the housing of the terminal device. The cover plate 40 is a transparent hard plate member. The cover plate 40 has a good protective effect on the display screen 10 and can achieve good light transmission.

Further, an ink layer 42a is provided between the cover plate 40 and the touch panel 30. The ink layer 42a corresponds to the shielding area 422 of the light shielding band 42. As illustrated in FIG. 1 and FIG. 2, the cover plate 40 includes an inner surface 40b close to the touch panel 30. The inner surface 40b is provided with the ink layer 42a corresponding to the shielding area 422 of the light shielding band 42. As one implementation, the ink layer 42a is printed on the inner surface 40b by a screen printing technique. By virtue of the opacity of the ink layer 42a, covering of the non-display area 112 can be achieved, and partial light of the light guide plate 20 is prevented from passing through. Normally, the ink layer 42a is black; the ink layer 42a causes the light shielding band 42 to be black. In other situations, the ink layer 42a may also use white ink.

Further, the key area 421 is provided with a key graphic code (not illustrated). The key graphic code is configured to identify the virtual key. As one implementation, the key graphic code is provided in a blank area of the ink layers 42a. Multiple different key graphic codes may be provided for multiple key areas 421, and each key graphic code can be configured to represent a key with a different function. When the light guide plate 20 is illuminated, the light of the light guide plate 20 passes through the key graphic code, such that the key graphic code glows and the pattern identified by the key graphic code can be seen on the exterior surface of the cover plate 40, and it is possible to identify a corresponding virtual key and use it to realize instruction input.

Further, an optical adhesive layer 20b is provided between the light guide plate 20 and the display screen 10. The light guide plate 20 is bonded to the display screen 10 via the optical adhesive layer 20b; in one aspect, this enhances the stable structure of the display screen assembly 100, in another aspect, the light guide plate 20 is directly attached to the display screen 10; therefore, the display screen 10 and the light guide plate 20 are attached seamlessly, the display surface 11 is free of dust and impurities, and the display effect of the display screen assembly 100 can be enhanced.

Further, the display screen assembly 100 further includes a light source drive board 50. The light source drive board 50 can be deemed as part of the lighting assembly. For instance, the light source drive board 50 is a stripe light source drive board. The light source drive board 50 is adjacent to the outer edge of the light guide plate 20. The light source 20a includes multiple LED lamp beads (not illustrated in the figures). The multiple LED lamp beads are provided on the light source drive board 50 and are arranged along the longitudinal direction of the light guide plate 20. The multiple LED lamp beads are configured to emit light towards the light guide plate 20. Specifically, the light source drive board 50 is provided with a drive circuit. When the display screen assembly 100 is applied to a terminal device, the light source drive board 50 can be electrically connected with the control assembly and obtain a current signal via the control assembly so as to drive the light source 20a to emit light. In this implementation, the light source drive board 50 is adjacent to the outer side surface 23 of the light guide plate 20. The multiple LED lamp beads are bonded to one side of the light source drive board 50 that close to the light guide plate 20. The light from the multiple LED lamp beads passes through the outer side surface 23 and is diffused through the light guide plate 20 so as to be emitted from the top surface 22. In other implementations, the edge of the light guide plate 20 may be exposed to the display surface 11, and the light source drive board 50 is adjacent to the bottom surface 21 that is exposed to the display screen 10. The light of the light source 20a passes through the bottom surface 21 and is emitted from the top surface 22.

Further, the edge of a surface on one side of the cover plate 40 that remote from the touch panel 30 is arc-shaped. The cover plate 40 includes an outer surface 40a provided opposite to the inner surface 40b. The edge of the outer surface 40a is curved in a circular arc. As one implementation, the edge of the outer surface 40a includes an arc-shaped surface 40c curved in a circular arc. The front projection area of the arc-shaped surface 40c at the inner surface 40b corresponds to the non-display area 112 of the display screen 10. Thus, by using the arc-shaped surface 40c, the refraction angle of the light passing through the cover plate 40 of the ink layer 42a can be changed, and it can be observed through the cover plate 40 that the ink layer 42a is narrowing, such that the display surface 11 of the display screen assembly 100 is visually larger.

Figure 3:
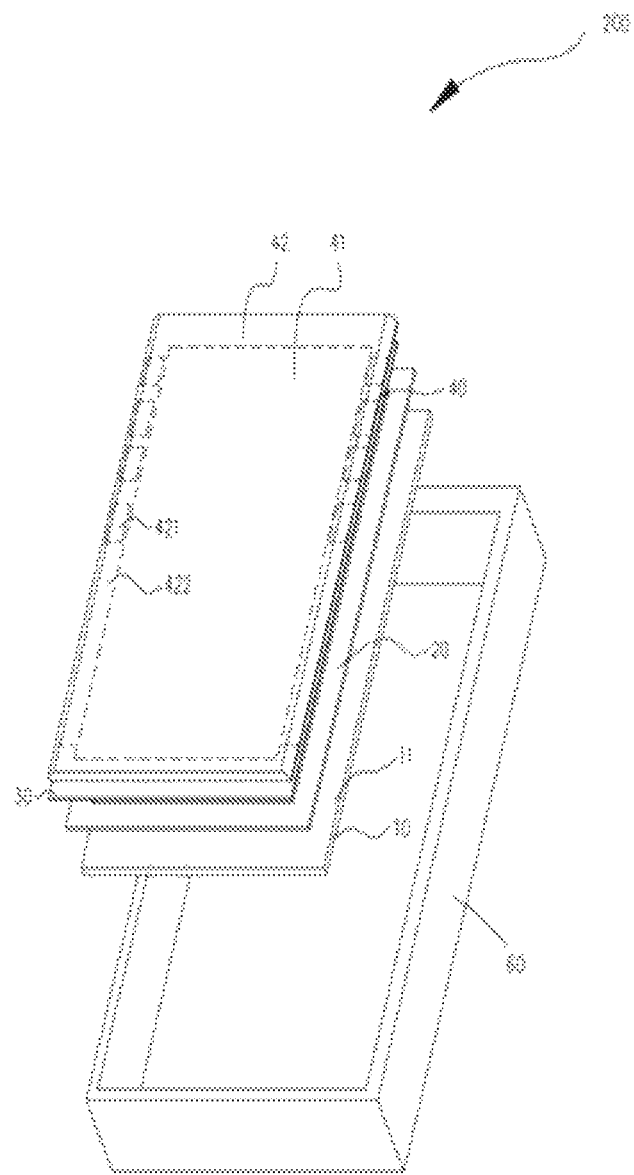
FIG. 3 is a schematic view of a terminal front cover according to an implementation of the present disclosure.
Figure 4:
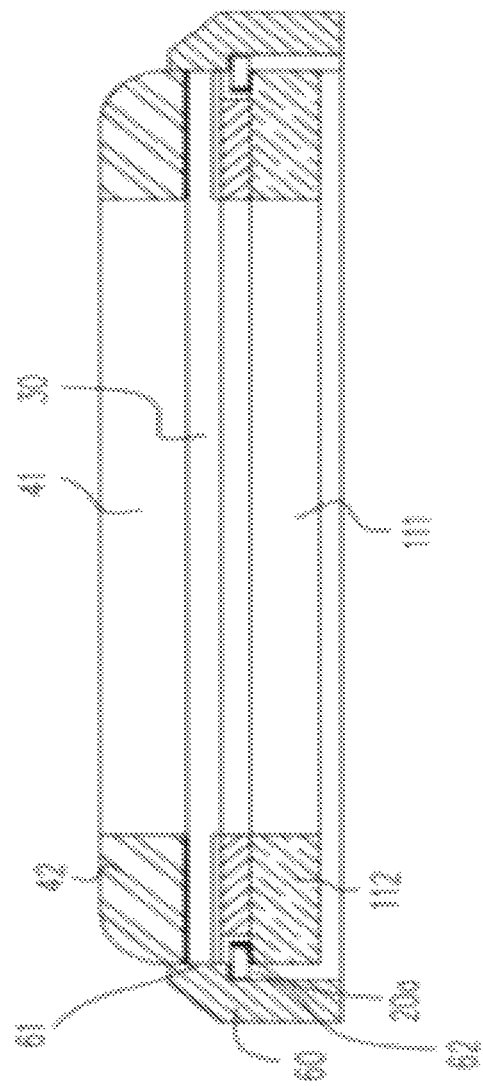
FIG. 4 is a cross-sectional view of the terminal front cover according to an implementation of the present disclosure.

The present disclosure further provides a terminal front cover 200. FIG. 3 is a schematic view of the terminal front cover 200 and FIG. 4 is a cross-sectional view of the terminal front cover 200. The terminal front cover 200 includes a display screen assembly 100. The terminal front cover 200 further includes a frame 60. The frame 60 is fixed to the edge of the cover plate 40.

In this implementation, the frame 60 can be made of plastic. The thickness of the frame 60 can be thinner so as not to affect the effective display area of the display area 111 of the display screen assembly 100. The frame 60 can stabilize the display screen assembly 100. When the display screen 10 is a touch display screen, the frame 60 can also be a weak polar material. In addition to show good insulation effect, the frame 60 can also play a role in the transmission of fingerprint induced electric field. The frame 60 includes an inner side surface 61. The outer side wall 43 of the cover plate 40 is fixed to the inner side surface 61.

As an implementation, the cover plate 40 can be integrally formed with the frame 60. As an implementation, a glass raw material member of the cover plate 40 is molded by press roll molding, and the cover plate 40 is obtained by a cutting process. The cover plate 40 is placed in a mold cavity of an injection mold, and then an injection molding process is carried out so that the frame 60 is integrally molded on the cover plate 40. So that the outer side wall 43 is better fitted to the inner side surface 61. The outer surface 40a of the cover plate 40 and the exterior surface of the frame 60 are in the same mold cavity, and the outer surface 40a and the exterior surface of the frame 60 can form a smooth surface while the frame 60 and the cover plate 40 are more stable in structure. In other implementations, if the frame 60 is made of a metal material, it is also possible to place the cover plate 40 in a mold cavity of a molding mold and inject liquid metal into the molding mold so that the frame 60 is integrally formed with the cover plate 40.

Further, the inner side of the frame 60 is provided with a groove 62. The light source 20a is configured to be accommodated in the groove 62. As one implementation, the groove 62 is arranged on an inner side surface 61. The light source drive board 50 and the light source 20a are fixed in the groove 62. The side wall of the groove 62 prevents the light of the light source 20a from being irradiated toward the frame 60 as well as the gap between the frame 60 and the cover plate 40. So that the groove 62 can prevent the light source 20a from leaking and thereby improve the performance of the display screen assembly 100. In the present implementation, the light source drive board 50 is engaged with the side wall of the groove 62. In other implementations, the light source drive board 50 may also be bonded to the side wall of the groove 62.

Figure 5:
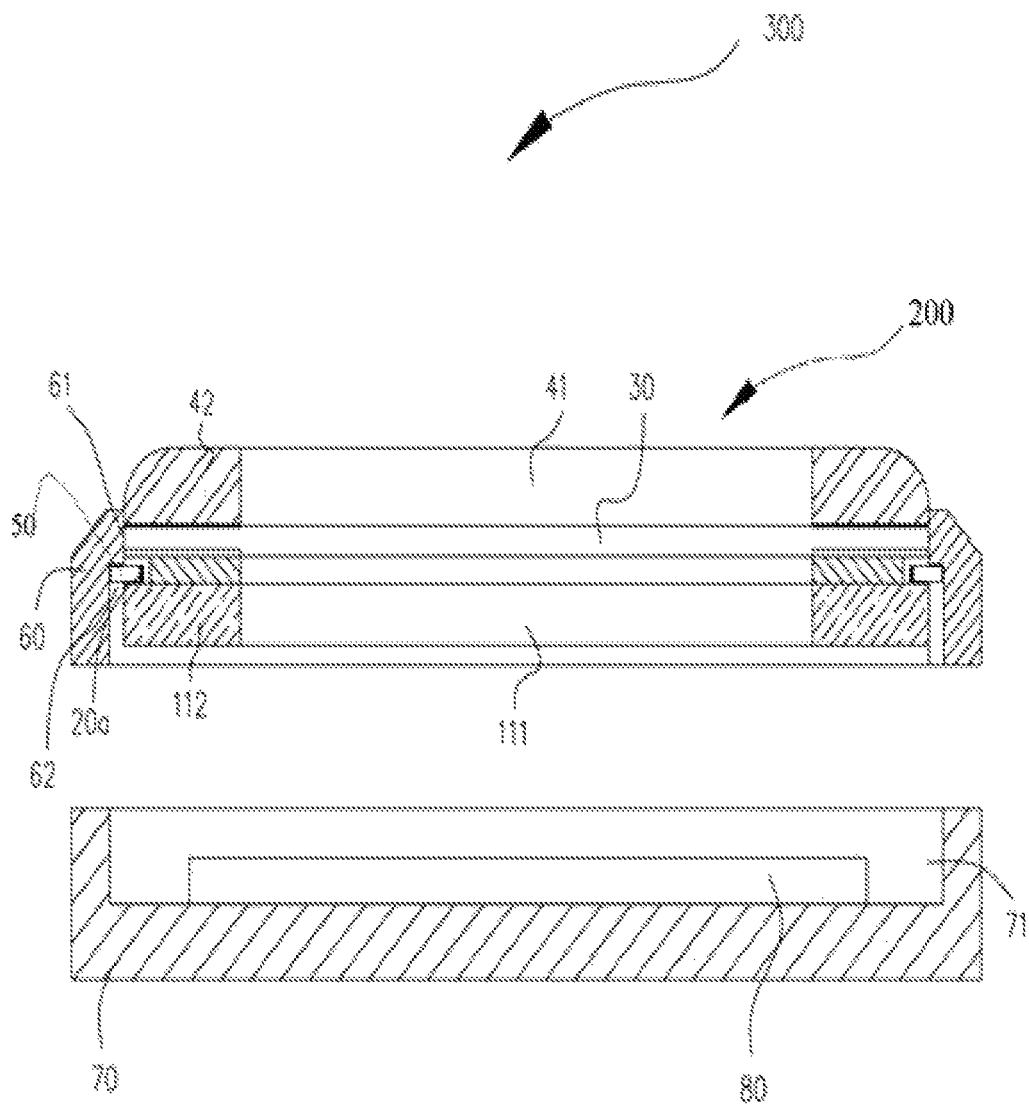
FIG. 5 is a cross-sectional view of a terminal according to an implementation of the present disclosure.

In the present disclosure, according to another implementation, there is provided a terminal 300. FIG. 5 is a cross-sectional view of the terminal 300 according to an implementation of the present disclosure. As illustrated in FIG. 5, the terminal 300 includes the terminal front cover 200 as illustrated in FIG. 3 or FIG. 4. Further, as illustrated in FIG. 5, the terminal 300 further includes a rear cover 70 and a control assembly 80. The rear cover 70 is provided with an accommodating chamber 71, the open end of which is located on the exterior surface of the rear cover 70. The terminal front cover 200 covers the open end, and the display screen 10 and the control assembly 80 are accommodated in the accommodating chamber 71. The control assembly 80 electrically connects the display screen 10 and the light source drive board 50 so as to control the display screen 10 and the light source 20a. It is to be understood that the terminal 300 is a terminal device, which may be one of a mobile phone, a notebook computer, a tablet computer, an electronic reader, an electronic album, a display and the like.

Unless otherwise indicated, various features described in the implementations of the present disclosure may be combined or replaced with each other. For example, details of the elements described in the implementations of the display screen assembly 100 can be equally applicable to the implementations of the terminal front cover 200 and the terminal 300 of the present disclosure.

In the display screen assembly and the terminal, the light guide plate is configured to cover the non-display area correspondingly, and the light source is used to illuminate the light guide plate. In addition, the light shielding band is configured to include the key area and the shielding area disposed around the key area. The key area is configured to pass through the light of the light guide plate and is provided corresponding to the virtual key of the touch panel. The shielding area is configured to shield the light of the light guide plate. In this way, the non-display area of the display screen can be utilized and therefore the display area of the display screen assembly can be increased effectively and is ergonomic.

In the description of the present disclosure, the term "one implementation", "some implementations", "illustrative implementation", "example", "specific example", or "some example" and the like means that a particular feature, structure, material, or characteristic described in connection with the implementation or example is included in at least one implementation or example of the present disclosure. In the present specification, the schematic expression of the above-mentioned terminology does not necessarily refer to the same implementation or example. Moreover, the particular feature, structure, material, or feature described may be combined in any implementation or example in any suitable manner.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A display screen assembly, comprising:
   a display screen comprising a display surface, the display surface having a display area and a non-display area surrounding the display area;
   a touch panel covering the display screen and provided with at least one virtual key in a portion covering the non-display area;
   a cover plate laminated on the touch panel and comprising a light shielding band corresponding to the non-display area, the light shielding band comprising a key area corresponding to the at least one virtual key, wherein the cover plate comprises a light transmitting portion surrounded by the light shielding band and corresponds to the display area of the display surface; and
   a lighting assembly configured to illuminate the key area and comprising a light guide plate sandwiched between the display screen and the touch panel, and a light source arranged on an outer edge of the light guide plate, wherein light emitted by the lighting assembly is adapted to pass through the key area and the light transmitting portion, and the light shielding band is configured to shield light passing through the key area.

2. The display screen assembly of claim 1, wherein an ink layer corresponding to areas other than the key area of the light shielding band is provided between the cover plate and the touch panel.

3. The display screen assembly of claim 1, wherein the key area is provided with a key graphic code configured to identify the at least one virtual key.

4. The display screen assembly of claim 1, wherein the lighting assembly comprises a light source drive board and multiple LED lamp beads provided on the light source drive board, and the multiple LED lamp beads are arranged along the longitudinal direction of the light guide plate and configured to emit light toward the light guide plate.

5. The display screen assembly of claim 1, wherein an edge of a surface on one side of the cover plate that is remote from the touch panel is arc-shaped.

6. The display screen assembly of claim 5, wherein the projection of the arc-shaped edge of the cover plate on a surface of one side of the cover plate that is adjacent to the touch panel corresponds to the non-display area of the display screen.

7. The display screen assembly of claim 1, wherein
   the lighting assembly has a first surface and a second surface opposite to each other,
   the first surface is adjacent to the display screen and the second surface is adjacent to the touch panel, and
   wherein the first surface and the second surface are formed as planes parallel to each other, or, the second surface is formed as an arc-shaped surface.

8. The display screen assembly of claim 1, wherein the touch panel and the cover plate are integrally formed.

9. A terminal front cover, comprising:
   a frame; and
   a display screen assembly, the display screen assembly comprising a display screen, a touch panel, a cover plate sequentially laminated and a lighting assembly, wherein
   the frame is fixed to the periphery of the cover plate;
   the display screen comprises a display surface having a display area and a non-display area surrounding the display area;
   the touch panel covers the display screen and is provided with at least one virtual key in a portion covering the non-display area;
   the cover plate is provided on one side of the touch panel that is remote from the non-display area, the cover plate comprising a light shielding band corresponding to the non-display area, the light shielding band and the non-display area are the same in size, the light shielding band comprising a key area corresponding to the at least one virtual key; and
   the lighting assembly is configured to illuminate the key area and comprises a light guide plate sandwiched between the display screen and the touch panel, and a light source arranged on an outer edge of the light guide plate, wherein an inner side of the frame is provided with a groove, and the lighting assembly has a light source accommodated in the groove.

10. The terminal front cover of claim 9, wherein an ink layer corresponding to areas other than the key area of the light shielding band is provided between the cover plate and the touch panel.

11. The terminal front cover of claim 9, wherein the key area is provided with a key graphic code configured to identify the at least one virtual key.

12. The terminal front cover of claim 9, wherein the cover plate and the frame are integrally formed.

13. The terminal front cover of claim 9, wherein the frame is made of one of plastic, metal, and weak polar substance.

14. A terminal, comprising:
   a control assembly;
   a rear cover; and
   a terminal front cover, the terminal front cover comprising a display screen assembly and a frame, wherein the display screen assembly comprises a display screen, a touch panel, and a cover plate sequentially laminated, and wherein the frame is fixed to the periphery of the cover plate;

the display screen comprises a display surface and the display surface has a display area and a non-display area surrounding the display area;

the touch panel covers the display screen and is provided with at least one virtual key in a portion covering the non-display area;

the cover plate comprises a light shielding band having comprising a key area corresponding to the at least one virtual key, and the light shielding band and the non-display area are the same in size;

the display screen assembly further comprises a lighting assembly configured to illuminate the key area and comprising a light guide plate sandwiched between the display screen and the touch panel and a light source arranged on an outer edge of the light guide plate;

the rear cover is disposed on the rear side of the terminal front cover, the rear cover is provided with an accommodating chamber, and the accommodating chamber has an open end located on the exterior surface of the rear cover, and the terminal front cover covers the open end; and the display screen and the control assembly are accommodated in the accommodating chamber, and the control assembly is configured to be electrically connected with the display screen and control the display screen.

15. The terminal of claim 14, wherein the touch panel is configured to cover the non-display area;

the light shielding band is configured to correspond to the non-display area; and the display screen assembly further comprises an ink layer provided between the cover plate and the touch panel configured to correspond to areas other than the key area of the light shielding band.

\* \* \* \* \*